(12) United States Patent
Chen

(10) Patent No.: US 6,305,595 B1
(45) Date of Patent: Oct. 23, 2001

(54) DIE SET FOR WELDING A PANEL LIKE HEAT PIPE TO A HEAT SINK

(76) Inventor: Yang-Shiau Chen, 10Fl., No. 406, Sec. 4 Jan-Ai Rd., Taipei (TW)

( * ) Notice: Subject to any disclaimer, the term of this patent is extended or adjusted under 35 U.S.C. 154(b) by 0 days.

(21) Appl. No.: 09/527,835

(22) Filed: Mar. 17, 2000

(51) Int. Cl.[7] ............................ B23K 37/00; B23K 31/02; B23P 6/00
(52) U.S. Cl. ......................... 228/44.3; 228/1.1; 228/183; 29/890.032
(58) Field of Search .................................. 228/44.3, 183, 228/1.1; 29/890.032; 219/540

(56) References Cited

U.S. PATENT DOCUMENTS

| | | | |
|---|---|---|---|
| 3,613,778 | * 10/1971 | Feldman | 165/105 |
| 3,680,189 | * 8/1972 | Noren | 29/157.3 R |
| 4,053,969 | * 10/1977 | Bayard | 29/157.3 |
| 4,601,089 | * 7/1986 | Gal | 29/157.3 |
| 4,601,422 | * 7/1986 | Dumargue et al. | 228/44.3 |
| 4,901,907 | * 2/1990 | Enokido et al. | 228/183 |
| 5,168,921 | * 12/1992 | Meyer, IV | 165/104.14 |
| 5,598,632 | * 2/1997 | Camarda et al. | 29/890.032 |
| 5,694,295 | * 12/1997 | Mochizuki et al. | 361/699 |
| 5,884,691 | * 3/1999 | Batchelder | 165/80.3 |
| 6,009,925 | * 1/2000 | Hall et al. | 156/358 |
| 6,158,645 | * 12/2000 | Sakamoto et al. | 228/110.1 |
| 6,223,970 | * 5/2001 | Chen | 228/44.3 |

FOREIGN PATENT DOCUMENTS

05335166A * 12/1993 (JP) ...................................... 228/1.1

* cited by examiner

Primary Examiner—M. Alexandra Elve
Assistant Examiner—L. Edmondson
(74) Attorney, Agent, or Firm—Bacon & Thomas, PLLC

(57) ABSTRACT

A die set for welding a panel like heat pipe to a heat sink, by the die set used in welding, the heat pipe with extremely high heat conductivity is effectively combined with the heat sink for use. Thereby, the heat sink can have better heat-conducting efficiency and working of it is fast and convenient. The die set includes a first and a second die seat. The first die seat is placed under a heat conductive bottom plate, and the top thereof has a first frame-like stub of which the top surface has a lot of protruding granules. The second die seat is placed above a heat conductive top plate, and the bottom thereof has a second frame-like stub (opposite to the first die seat) of which the bottom surface also has a lot of protruding granules. The top plate is lapped over the bottom plate with a connecting frame therebetween in opposition to and having a shape similar to that of any of the first and second frame-like stubs. The connecting frame is in a vacuum state internally, and is provided therein with a capillary structure and condensate. The end faces of the first and the second frame-like stubs are treated by pulsation with high periodic waves to integrally combine the connecting frame with the top plate and the bottom plate, thereby the top and the bottom plates form a heat sink with a panel-like heat pipe.

4 Claims, 8 Drawing Sheets

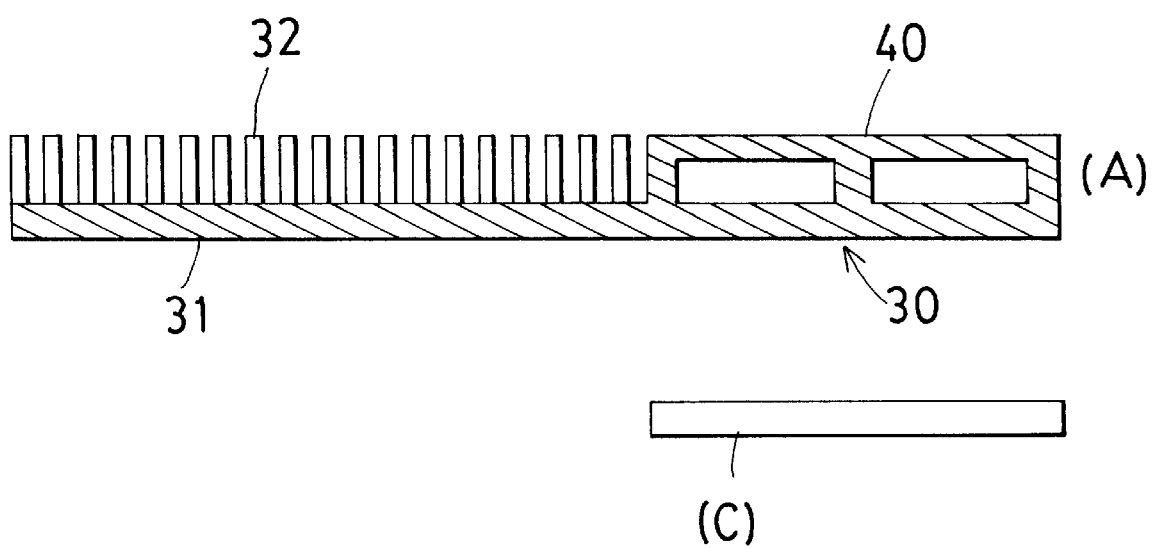
F I G. 12

DIE SET FOR WELDING A PANEL LIKE HEAT PIPE TO A HEAT SINK

BACKGROUND OF THE INVENTION

1. Field of the Invention

The present invention relates to a die set for welding a panel like heat pipe to a heat sink, by the die set used in welding, the die set is provided to make the panel like heat pipe with extremely high heat conductivity effective in combining with the heat sink for use. Heat conducting efficiency of the heat sink can thus be increased. The present invention especially suits to solve the heat-sinking problem resided in CPU's in computer industry.

2. Description of the Prior Art

As is well known, a CPU in a computer may generate large amount of heat during operation, and the faster the speed of operation is, the larger the amount of watt generated will be. When temperature on the CPU is too high, operation of it will be adversely influenced to induce failure of the computer. Thereby, if the heat-sinking problem is not solved, speed of operation of the CPU will be limited, so that the CPU cannot be developed toward the goal of having performance of high speed.

A computer includes a conventional heat sink which is comprised of an aluminum panel and a plurality of heat sinking fins, the aluminum panel is provided on the top of a CPU to absorb heat of the CPU and conduct to the heat sinking fins. Then the heat sinking fins make heat exchange with cool air to lower temperature of the CPU.

In the conventional heat sink for a computer, if the computer is a desktop computer which has a larger mainframe, it has a larger space internally, and a fan can be added on the heat sink to speed up heat exchange of the fins with cool air, such situation can afford a CPU with higher speed for heat sinking; if the computer is a notebook computer which is lighter, thinner and convenient for carrying, a fan added thereon may increase its thickness and does not meet the idea of design of such a notebook computer. Therefore, it is not an ideal way to add a fan thereon to speed up heat sinking of the CPU.

The above stated way of adding fan does not solve the heat-sinking problem resided in a CPU, the main reason thereof is limitation of space, if temperature of the CPU can be transmitted to a larger space, such problem can be easily solved. There are computer manufacturers to connect heat sinks to the housings of computers made of aluminum magnesium alloy to render heat to be transmitted to outside. However, according to results of tests, lowering of temperature by such is quite limited, the problem is evidently that heat cannot be transmitted very fast and effectively to the housings of the computers made of aluminum magnesium alloy. In view of this, solving the problem of heat conducting is the most important subject in development of heat sinks for the CPU's.

In other words, if the problem of heat conducting in heat sinks for the CPU's can be overcome, development of computers in the future must be contributive, and this is the motive of study and development of the present invention.

SUMMARY OF THE INVENTION

In view of this, the inventor provides the present invention after continuous study and development in overcoming the problem against the situations stated above and based upon his professional and doctoral knowledge (from Ohio State University) of manufacturing engineering and practical experience of years in study, designing and development of the structure of such products entrusted by computer manufacturers. The present invention can solve the problems resided in heat conducting in heat sinks for the CPU's of computers.

In the process of study and development of the present invention, the main work is to combine a heat pipe with a heat sink. In the technique of heat conducting, a heat pipe which is called a "super heat conductor" has a heat conductivity which is larger than 10,000 W/M° C., this is more than 30 folds as of that of copper (being 300 W/M° C.); and it is structurally simple, light weighted and highly reliable, thereby, it is an essential element for satellites and space ships. If the heat pipe and the heat sink can be combined with each other, the heat sink must have the best performance due to providing the excellent heat conductivity.

Before combination of the heat pipe and the heat sink, the first problem encountered is that a normal heat pipe is a round pipe; its contact area with the top of a CPU is too small to effectively absorb heat. According to investigation by the inventor of the present invention, there have been panel-like heat pipes developed in Japan and the U.S.A. as shown in FIGS. 1 to 3. The panel-like heat pipes are rectangular and are comprised each of a top plate 60 and a bottom plate 70, wherein, the bottom plate 70 is provided with a peripheral frame 71 which is provided with a partition rib 72, when the top plate 60 is lapped over the bottom plate 70, air in several separated spaces 73 divided from the bottom plate 70 by the peripheral frame 71 and the partition rib 72 are drawn out to form vacuum state, and the separated spaces 73 are placed therein with a capillary structure and condensate (vacuum state, a capillary structure and condensate are the three necessary elements for forming a heat pipe, and this is a conventional technique, and is not described further in detail). The top surfaces of the peripheral frame 71 and the partition rib 72 are welded to the top plate 60 to form a panel-like heat pipe.

A conventional panel-like heat pipe stated above still has two problems to be solved if they are used in a heat sink:

1. When the top surfaces of the peripheral frame 71 and the partition rib 72 are welded to the top plate 60, welding needs high temperature, the external surfaces of the top plate 60 and the bottom plate 70 will be undulate and uneven; this may adversely influence speed of heat absorbing.
2. The panel-like heat pipe and the heat sink are two individual members, if the panel-like heat pipe is adhered to the top surface of the heat sink with thermal grease, the heat absorbed by the heat sink cannot be transmitted to the panel-like heat pipe; thereby, time for heat absorbing of the panel-like heat pipe is dragged.

The way to solve the aforesaid first problem by the inventor of the present invention is to heat the area to be combined with by using high periodic waves, thereby, the trouble of deformation to make the panel-like heat pipe undulate and uneven can be solved. The way to solve the aforesaid second problem of the present invention is to directly combine the panel-like heat pipe with the heat sink during manufacturing; thereby, there will be no problem in worrying how to combine the two separated members.

The ways to solve the aforesaid two problems look simple, but they are uneasy in practice, the inventor of the present invention provides a die set for processing after continuous study and tests.

The die set for welding process of the present invention to combine the panel-like heat pipe with the heat sink is comprised of a first and a second die seat. The first die seat is placed under a heat conductive bottom plate, and the top thereof is provided at least with a first frame-like stub of which the top surface is provided with a lot of protruding granules. The second die seat is placed above a heat conductive top plate, and the bottom thereof is provided at least with a second frame-like stub (in opposition to that of the first die seat) of which the bottom surface is also provided with a lot of protruding granules. The heat conductive top plate is lapped over the heat conductive bottom plate with a connecting frame therebetween in opposition to and having a shape similar to that of any of the first and second frame-like stubs. The connecting frame is in a vacuum state internally, and is provided therein with a capillary structure and condensate. The end faces of the first and the second frame-like stubs are treated by pulsation with high periodic waves to integrally combine the connecting frame, the heat conductive top plate and the heat conductive bottom plate; thereby the heat conductive top plate and the heat conductive bottom plate form a heat sink with a panel-like heat pipe, thus the object stated above can be achieved.

To combine the panel-like heat pipe with the heat sink by welding in the present invention has the following advantages:

1. High periodic waves used on the processing die set to melting combine at the combining area can avoid deformation of the panel-like heat pipe and can render proceeding of the processing convenient and fast
2. The first and the second die seats providing the first and the second frame-like stubs in opposition to each other can allow simultaneous processing for multiple sets of panel-like heat pipes and heat sinks; thus cost of production can be reduced.
3. When the panel-like heat pipe and heat sink are combined with each other, only the combining area is processed; therefore shape of the heat sink does not have limitation, the heat sink can be designed in pursuance of various situations.
4. The panel-like heat pipe and heat sink are combined with each other directly with the processing die set; hence when in use, the panel-like heat pipe can absorb heat directly and transmit it very fast for heat exchange by the heat sink, heat conductivity can thus be surely increased.

The present invention will be apparent in its particular structure and effects after reading the detailed description of the preferred embodiments thereof in reference to the accompanying drawings.

BRIEF DESCRIPTION OF THE DRAWINGS

FIG. 12 is a perspective view of the fourth embodiment of the heat conductive top and bottom plates of the present invention.

DETAILED DESCRIPTION OF THE PREFERRED EMBODIMENT

Figure 1:
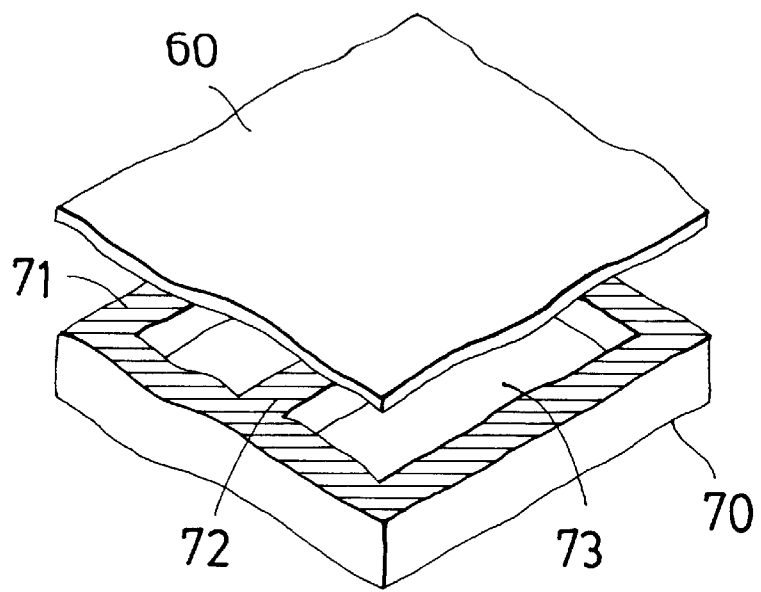
FIG. 1 is an analytic perspective view of a conventional panel-like heat pipe.
Figure 2:
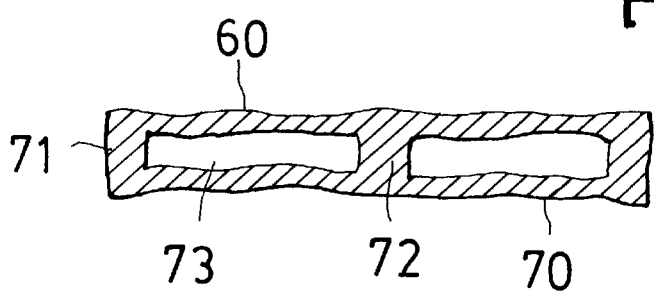
FIG. 2 is a sectional side view of the conventional panel-like heat pipe.
Figure 3:
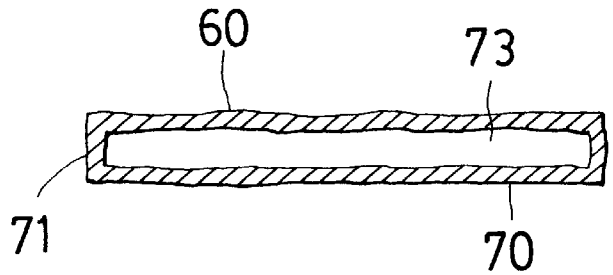
FIG. 3 is a sectional front view of the conventional panel-like heat pipe.

Referring to FIGS. 4 to 7, the processing die set for welding a panel like helit pipe to a heat sink of the present invention is comprised of a first die scat 10 and a second die scat 20. The first die scat 10 is placed under a heat conductive bottom plate 30, and the top thereof is provided with a first frame-like stub 11 of which the top surface is provided with a lot of protruding aranules 12. The second die scat 20 is placed above a heat conductive top plate 40, and the bottom thereof is provided with a second frame-like stub 21 (in opposition to the first die seat 10) of which the bottom surface is also provided with a lot of protruding granules 22. The heat conductive top plate 40 is lapped over the heat conductive bottom plate 30 with a connecting frame 50 therebetween in opposition to and having a shape similar to that of any of the first and second frame-like stubs 11, 21. The connecting frame 50 is in a vacuum state internally, and is provided therein with a capillary structure and condensate (not shown). The end faces of the first and the second frame-like stubs 11, 21 are treated by pulsation withl high periodic waves to integrally combine the connecting frame 50, the heat conductive top plate 40 and the heat conductive bottom plate 30; thereby the heat conductive top plate 40 and the heat conductive bottom plate 30 form a heat sink "B" with a panel-like heat pipe "A", thus the object stated above can be achieved.

Figure 4:
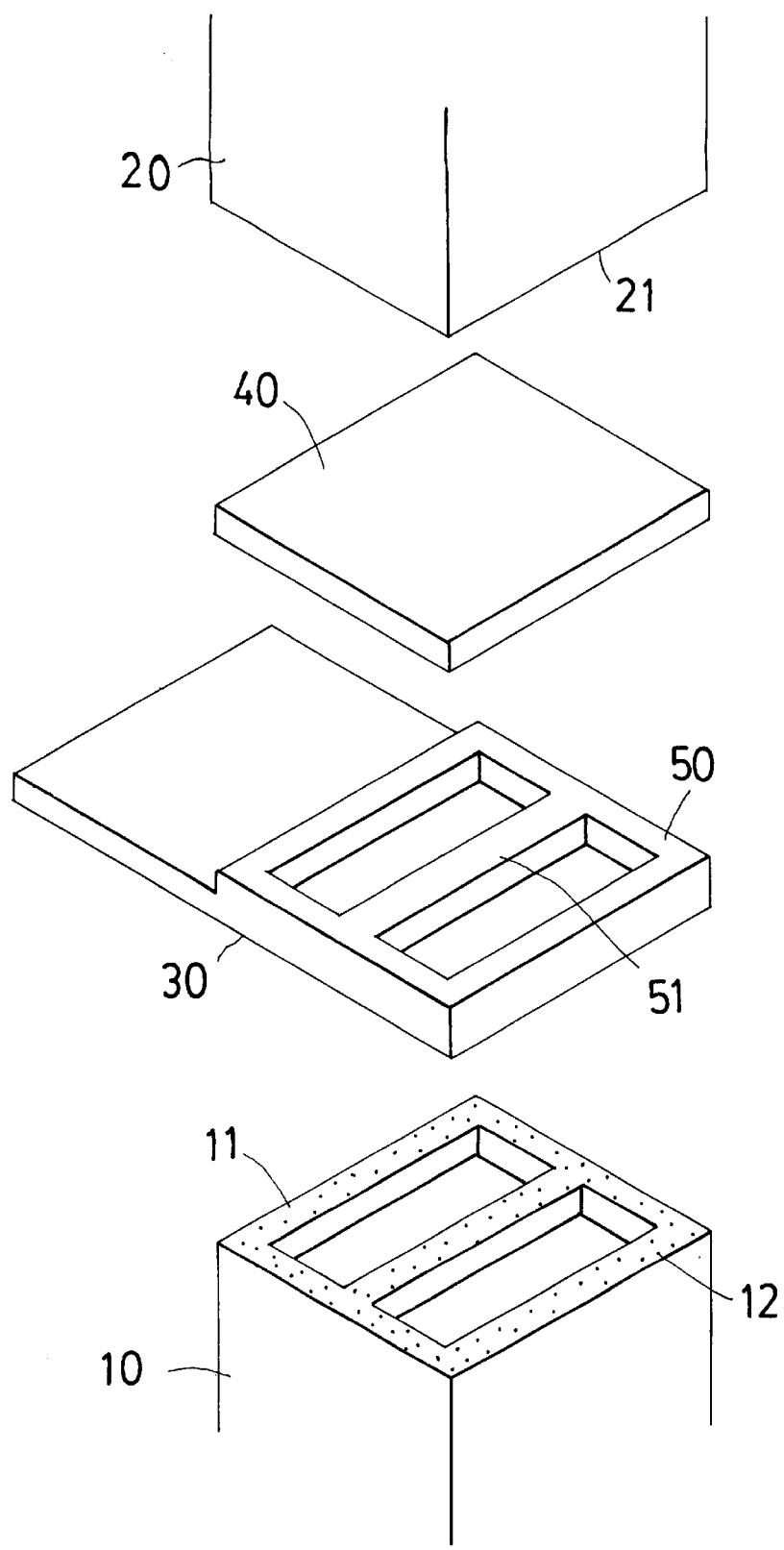
FIG. 4 is an anatomic perspective view showing the processing die set, the heat conductive top and bottom plates of the present invention.
Figure 5:
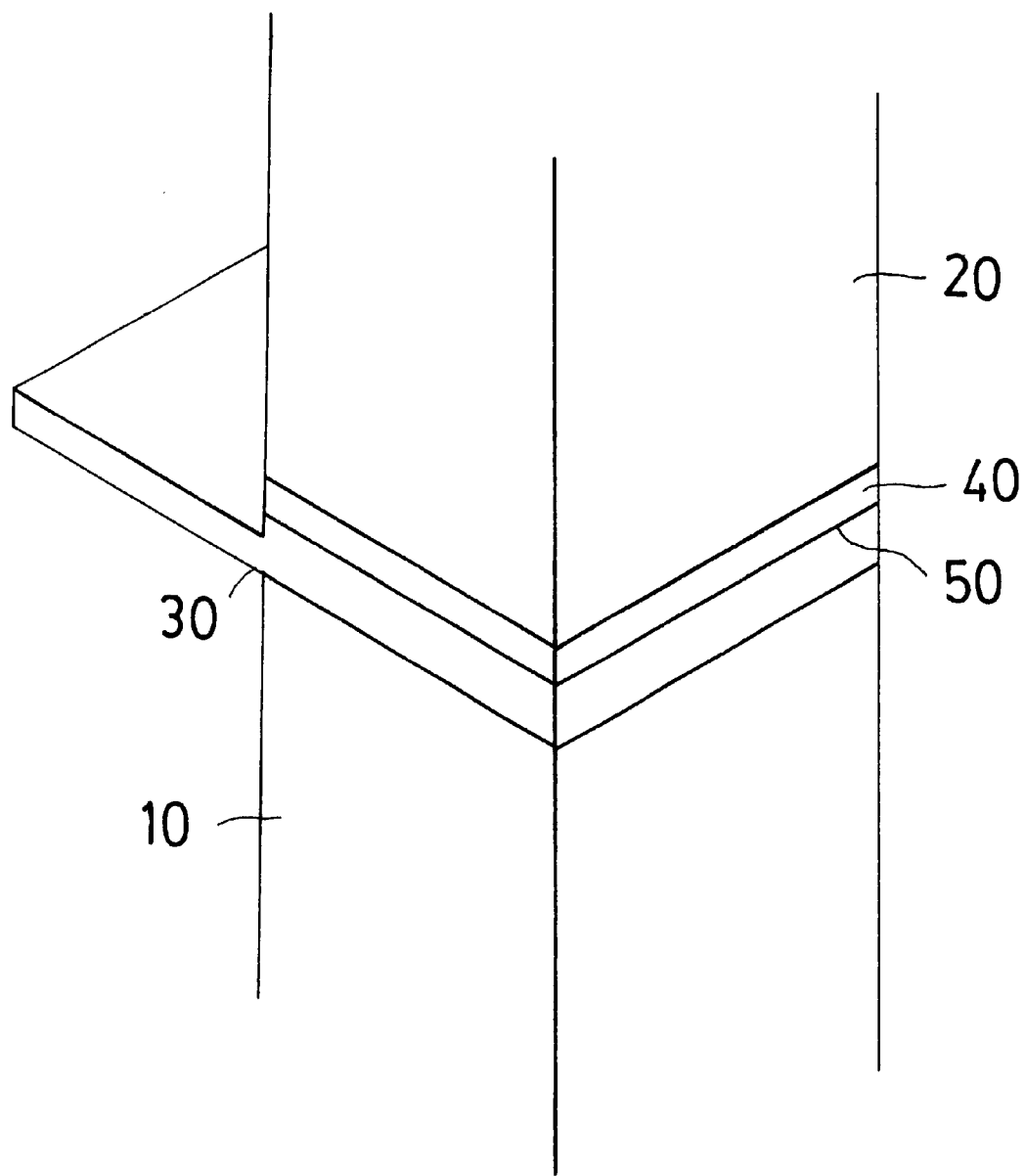
FIG. 5 is a schematic perspective view showing processing in the present invention.

Referring FIG. 4, the connecting frame 50 in the aforementioned embodiment can be integrally formed with the heat conductive bottom plate 30 in advance; when the heat conductive top plate 40 and the heat conductive bottom plate 30 are combined with each other, it only needs that the contact area between the top surface of the connecting frame 50 and the heat conductive top plate 40 is melted for combination.

The connecting frame 50 is provided with a partition rib 51; when the heat conductive top plate 40 is lapped over the heat conductive bottom plate 30, the heat conductive top plate 40 and the heat conductive bottom plate 30 are divided into a plurality of separated spaces 52 (FIGS. 6, 7) to have therein a vacuum state, a capillary structure and condensate.

Figure 6:
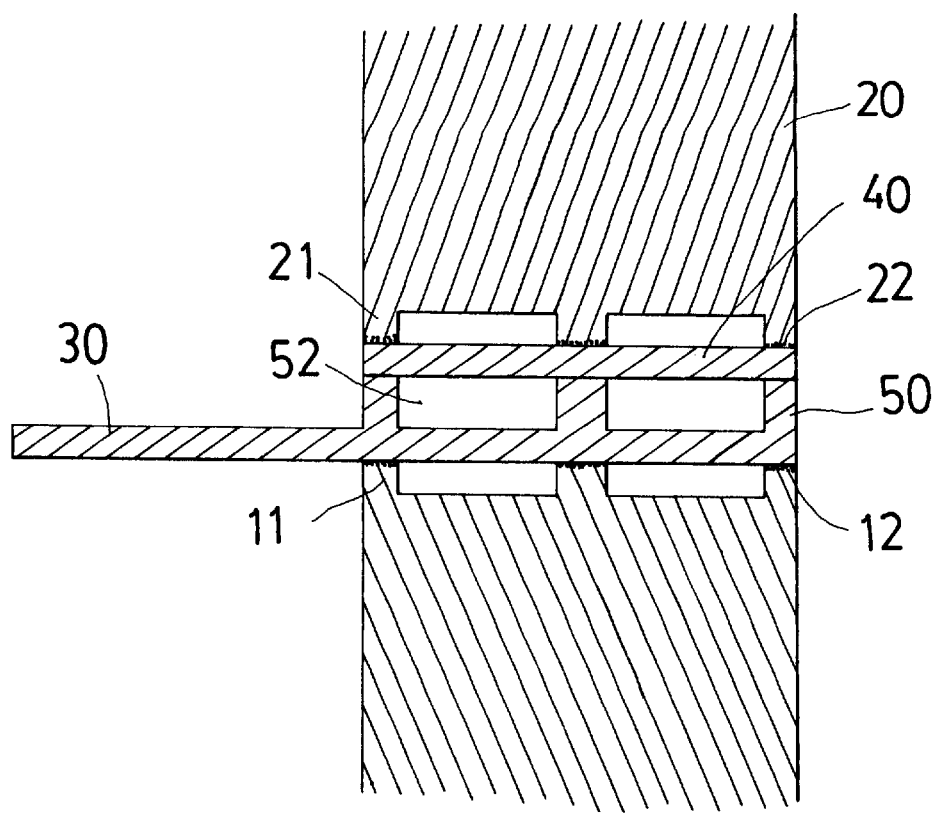
FIG. 6 is a sectional side view showing processing in the present invention.
Figure 7:
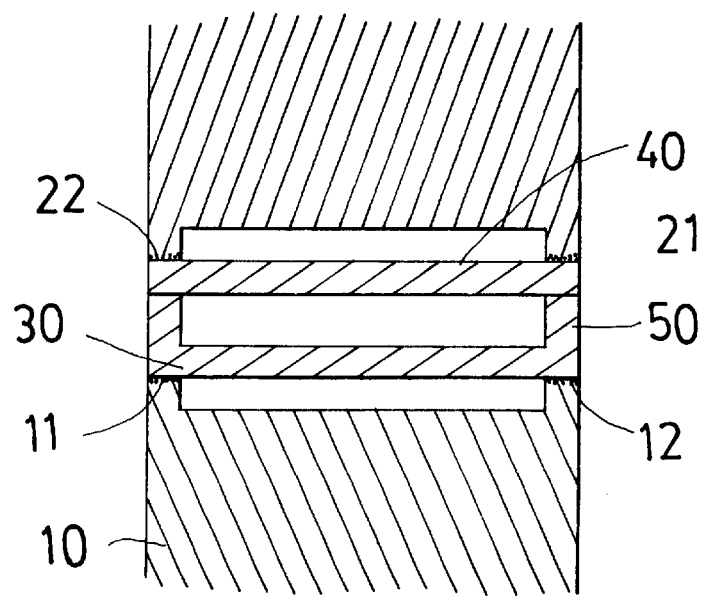
FIG. 7 is a sectional front view showing processing in the present invention.

Referring to FIGS. 6 and 7, the protruding granules 12, 22 on the top and bottom surfaces of the first and second frame-like stubs 11, 21 respectively are provided to let in the high periodic waves therethrough to make more stable, surer and faster melting combination.

Figure 8:
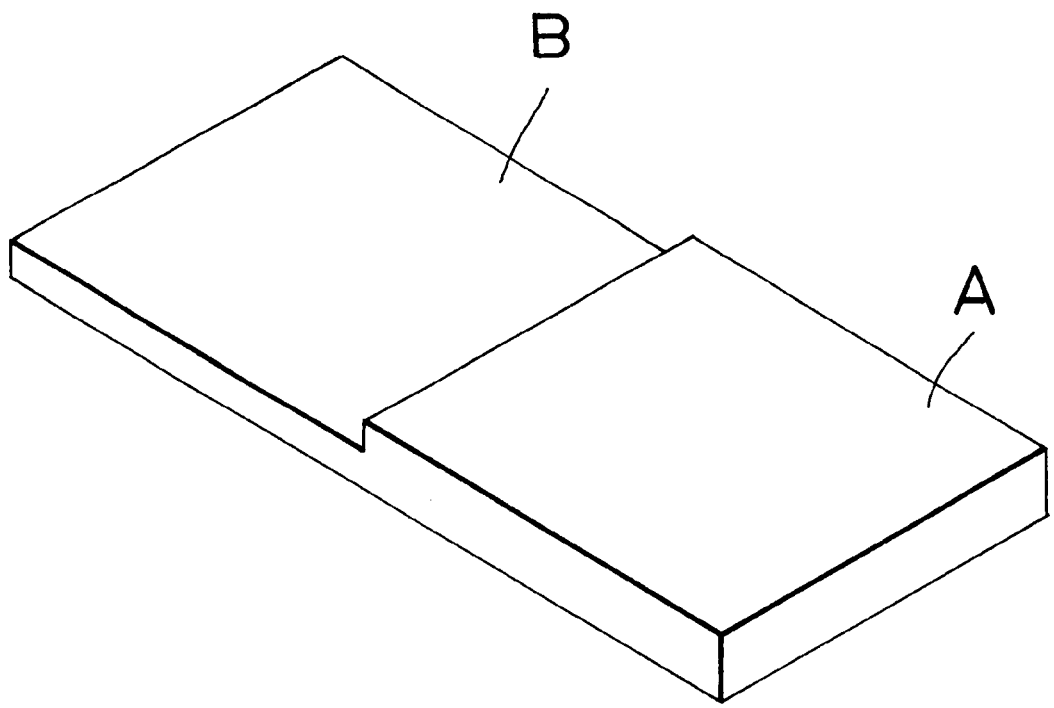
FIG. 8 is a schematic view showing use of the present invention after combination of the panel-like heat pipe and heat sink of the present invention.
Figure 8:
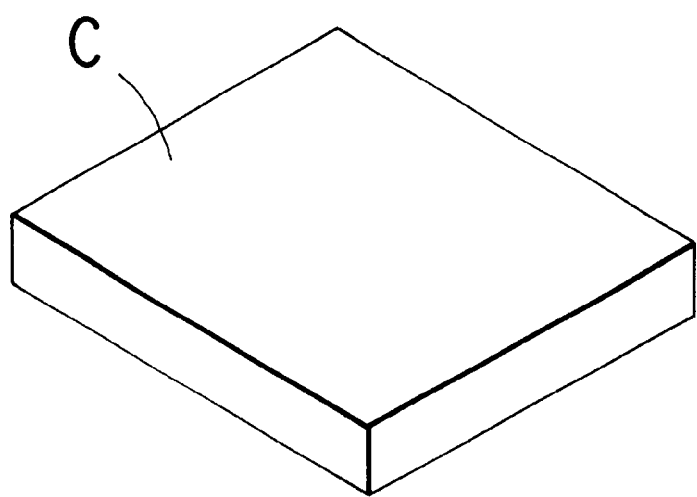

Referring to FIG. 8 which is a schematic view showing use of the present invention after combination of the panel-like heat pipe "A" and heat sink "B" of the present invention, wherein, the panel-like heat pipe "A" can be lapped over the top surface of a CPU "C" to fast absorb the heat generated by the CPU "C".

Figure 9:
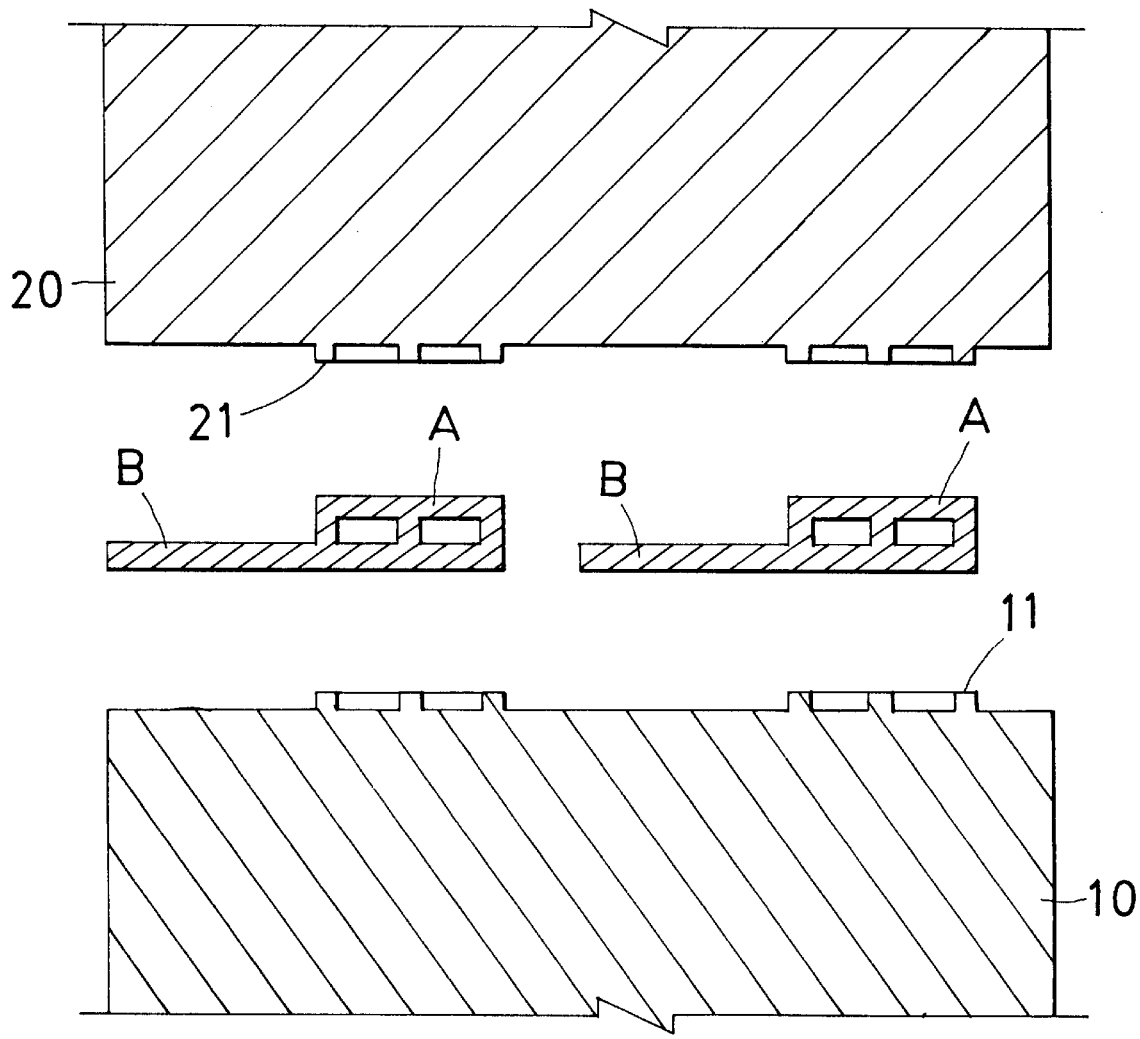
FIG. 9 is a sectional view of the second embodiment of the processing die set of the present invention.

Referring to FIG. 9 which is a sectional view of the second embodiment of the processing die set of the present invention, wherein, the first and second frame-like stubs 11, 21 of the first and second die scats 10, 20 can be of multiple sets. So that multiple sets of panel-like heat pipes and heat sinks are allowed for processing simultaneously in favor of production.

Figure 10:
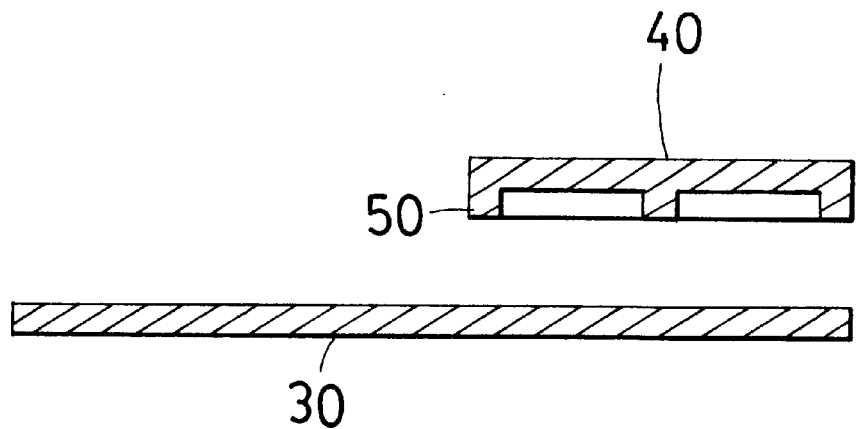
FIG. 10 is a perspective view of the second embodiment of the heat conductive top and bottom plates of the present invention.

Referring to FIG. 10 which is a perspective view of the second embodiment of the heat conductive top and bottom plates 40, 30 of the present invention, wherein, the connecting frame 50 can be integrally formed with the heat conductive top plate 40 in advance, when the heat conductive top plate 40 and the heat conductive bottom plate 30 are combined with each other, it only needs that the contact area between the top surface of the connecting frame 50 and the heat conductive top plate 40 is melted for combination.

Figure 11:
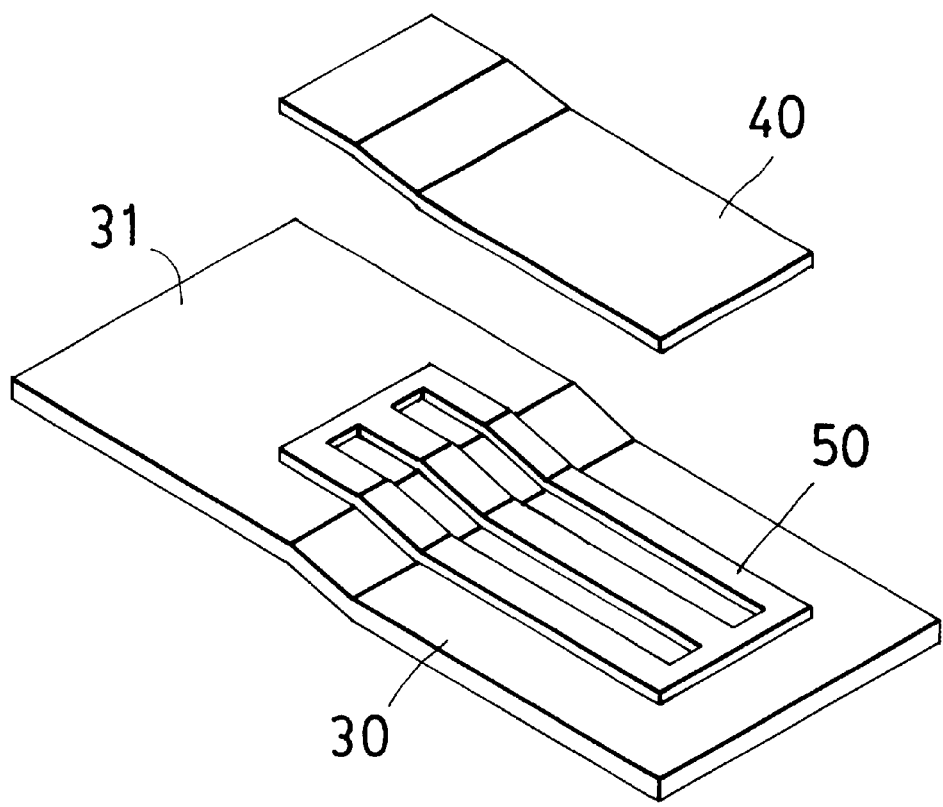
FIG. 11 is an analytic perspective view of the third embodiment of the heat conductive top and bottom plates of the present invention.

Referring to FIG. 11 which is an analytic perspective view of the third embodiment of the heat conductive top and bottom plates 40, 30 of the present invention, wherein, the connecting frame 50 can be integrally formed with the heat conductive top plate 40 or the heat conductive bottom plate 30 in advance, while the heat conductive top plate 40 or the heat conductive bottom plate 30 can be extended over the area of the connecting frame 50 in any direction to form a heat sinking portion 31. Thus the heat sink "B" can be designed in pursuance of allowance of the space limitation of a mainframe of a computer.

Referring to FIG. 12 which is a perspective view of the fourth embodiment of the heat conductive top and bottom plates 40, 30 of the present invention, wherein, the heat sinking portion 31 can further be provided with a plurality of fins 32. After combining, the panel-like heat pipe "A" can be lapped over the top surface of a CPU "C" to fast absorb the heat generated by the CPU "C", and the heat is transmitted to the fins 32 of the heat sinking portion 31 for heat exchange.

The names of the members composing the present invention and the drawings are only for illustrating the preferred embodiments of the present invention, and not for giving any limitation to the scope of the present invention. Various modifications or changes can be made to the elements of the present invention without departing from and fall within the scope of this invention.

What is claimed is:

1. A die set for welding a panel heat pipe to a heat sink, said panel heat pipe and said heat sink comprising a heat conductive top plate and a heat conductive bottom plate with a connecting frame therebetween, said connecting frame forming a sealed space when said heat conductive top plate and said heat conductive bottom plate are welded thereto and which space contains a vacuum state, a capillary structure and condensate; said die set for welding comprising:

a first die seat, adapted to be placed under said heat conductive bottom plate, the top of said seat comprises a first stub shaped to conform with and oppose said connecting frame, the top surface of said first stub contains multiple protruding granules; and a second die seat, adapted to be placed above said heat conductive top plate, the bottom thereof comprises a second stub shaped to conform with and oppose said first die seat, the bottom surface of said second stub contains multiple protruding granules;

the end faces of said first and the second opposed stubs are adapted to be treated by pulsation with high periodic waves to integrally combine said connecting frame with said heat conductive top plate and said heat conductive bottom plate.

2. A die set for welding as in claim 1, wherein, said first and second stubs have at least one partition mating rib to conform to at least one partition in said heat conductive bottom plate and said heat conductive top plate which form a plurality of separated spaces in said plates.

3. A die set for welding a panel heat pipe to a heat sink, said panel heat pipe and said heat sink comprising a heat conductive top plate and a heat conductive bottom plate with a connecting frame therebetween, said connecting frame forming a sealed space when said heat conductive top plate and said heat conductive bottom plate are welded thereto, said space contains a vacuum state, a capillary structure and condensate;

said die set for welding comprising:

a first die seat, adapted to be placed under said heat conductive bottom plate, the top of said seat comprises a first stub shaped to conform with and oppose said connecting frame, the top surface of said first stub contains a plurality of protruding granules; and a second die seat, adapted to be placed above said heat conductive top plate, the bottom thereof comprises a second stub shaped to conform with and oppose said first die seat, the bottom surface of said second stub contains multiple protruding granules;

the end faces of said first and the second stubs are adapted to be treated by pulsation with high periodic waves to integrally combine said connecting frame with said heat conductive top plate and said heat conductive bottom plate;

wherein, said first and second stubs of said first and second dies seats are of multiple sets, thereby multiple sets of panel heat pipes and heat sinks are adapted to being simultaneously combined.

4. A die set for welding as in claim 3, wherein, said first and second stubs have at least one partition mating rib to conform to at least one partition in said heat conductive bottom plate and said heat conductive top plate which form a plurality of separated spaces in said plates.

* * * * *